United States Patent
Brockmann et al.

(10) Patent No.: US 12,544,244 B2
(45) Date of Patent: Feb. 10, 2026

(54) CATHETER

(71) Applicant: Universitätsmedizin der Johannes Gutenberg-Universität Mainz, Mainz (DE)

(72) Inventors: Marc Alexander Brockmann, Mainz (DE); Yasemin Tanyildizi, Frankfurt (DE)

(73) Assignee: UNIVERSITÄTSMEDIZIN DER JOHANNES GUTENBERG-UNIVERSITÄT MAINZ, Mainz (DE)

( * ) Notice: Subject to any disclaimer, the term of this patent is extended or adjusted under 35 U.S.C. 154(b) by 694 days.

(21) Appl. No.: 16/647,032

(22) PCT Filed: Sep. 12, 2018

(86) PCT No.: PCT/DE2018/100775
§ 371 (c)(1),
(2) Date: Mar. 13, 2020

(87) PCT Pub. No.: WO2019/052605
PCT Pub. Date: Mar. 21, 2019

(65) Prior Publication Data
US 2020/0253762 A1    Aug. 13, 2020

(30) Foreign Application Priority Data
Sep. 13, 2017   (DE) .................. 102017121251.5

(51) Int. Cl.
*A61F 2/95*      (2013.01)
*A61B 17/00*     (2006.01)
(Continued)

(52) U.S. Cl.
CPC ............ *A61F 2/95* (2013.01); *A61B 18/02* (2013.01); *A61B 2017/00867* (2013.01);
(Continued)

(58) Field of Classification Search
CPC ....... A61B 17/22; A61B 17/221; A61B 18/02; A61B 2017/00867; A61B 2018/0212;
(Continued)

(56) References Cited

U.S. PATENT DOCUMENTS

| 6,217,585 B1 | 4/2001 | Houser |
| 2005/0159770 A1* | 7/2005 | Divani ................ A61M 29/00 606/200 |

(Continued)

FOREIGN PATENT DOCUMENTS

| DE | 602004010344 T2 | 4/2005 |
| DE | 102006039823 A1 | 3/2008 |

(Continued)

*Primary Examiner* — Mohamed G Gabr
(74) *Attorney, Agent, or Firm* — Johnson, Marcou, Isaacs & Nix, LLC; Jennifer Stachniak

(57) ABSTRACT

A catheter for insertion into a vessel (6) is designed at its free end (2) such that, in a first state, it is cylindrical and, in a second state, it has a conical shape, the largest diameter being associated with the peripheral end (2). The aim of the invention is that of providing a catheter of the type mentioned at the outset which avoids thrombus material trapped in a stent from being removed when a stent is retracted.

8 Claims, 1 Drawing Sheet

(51) Int. Cl.
*A61B 18/02* (2006.01)
*A61M 25/00* (2006.01)

(52) U.S. Cl.
CPC . *A61B 2018/0212* (2013.01); *A61B 2218/007* (2013.01); *A61F 2002/9528* (2013.01); *A61M 25/0074* (2013.01)

(58) Field of Classification Search
CPC ......... A61B 2217/005; A61B 2218/007; A61F 2/82; A61F 2/95; A61F 2002/9528; A61M 25/0074; A61M 25/0082
See application file for complete search history.

(56) References Cited

U.S. PATENT DOCUMENTS

| | | | |
|---|---|---|---|
| 2006/0282152 A1* | 12/2006 | Beyerlein | A61F 2/95 623/1.11 |
| 2010/0174355 A1* | 7/2010 | Boyle | 623/1.12 |
| 2012/0165858 A1 | 6/2012 | Eckhouse | |
| 2014/0180155 A1* | 6/2014 | Freitag | A61M 16/0447 604/266 |
| 2015/0282821 A1 | 10/2015 | Look | |

FOREIGN PATENT DOCUMENTS

| | | |
|---|---|---|
| DE | 102007048794 A1 | 4/2009 |
| WO | 2015058001 A1 | 4/2015 |

\* cited by examiner

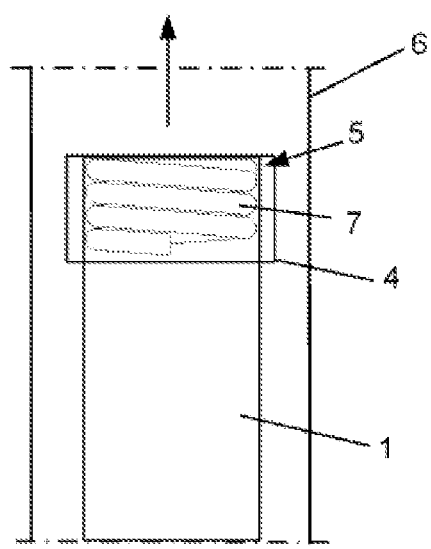
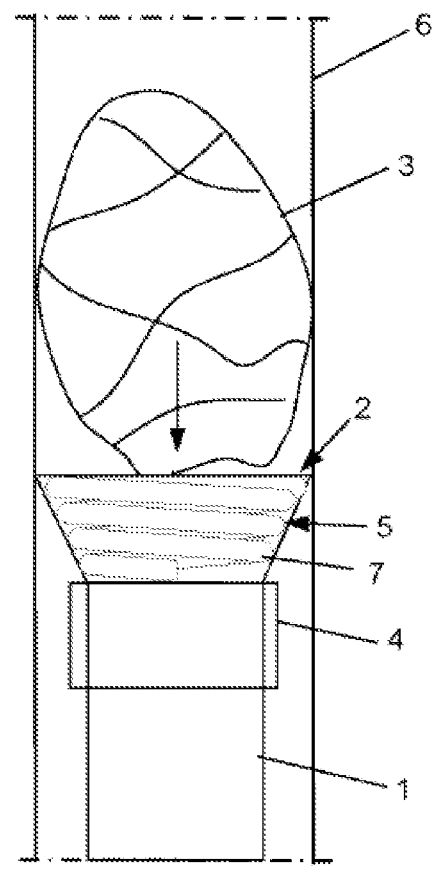
Fig. 1
Fig. 2

CATHETER

CROSS REFERENCE TO RELATED APPLICATIONS

This application is the U.S. national stage of International Application No. PCT/DE2018/100775, filed on 2018 Sep. 12. The international application claims the priority of DE 102017121251.5 filed on 2017 Sep. 13; all applications are incorporated by reference herein in their entirety.

BACKGROUND

The invention relates to a catheter for insertion into a vessel.

Care for acute strokes is one of the central tasks of neuroradiological and neurological clinics. Two milestones in stroke therapy have been the introduction of special units for stroke patients, i.e. stroke units, and the results of a study by the National Institute of Neurological Disorders and Stroke (NINDS, 1996) which demonstrated the evidence for intravenous thrombolysis (IVT) by means of recombinant tissue plasminogen activator ("recombinant tissue-type plasminogen activator", rTPA). The introduction of stroke units and the findings of the aforementioned study (NINDS, 1996) significantly improved the existing concept of primary care for patients, as a result of which permanent disabilities and the mortality rate of those affected has been reduced. The resulting therapy of choice for an ischemic stroke was previously intravenous thrombolysis (IVT) within approximately 4.5 hours from the onset of symptoms. However, this therapy often does not lead to a sufficient treatment result in clinical practice because thrombi with a length of >6-7 mm cannot be immediately dissolved within a short time by a genetically engineered tissue plasminogen activator (rTPA). Therefore, an intensive search for more effective therapeutic methods continued. A more effective method was found in mechanical thrombectomy (MT).

Mechanical thrombectomy is currently performed inter alia using intracranial stents (i.e. stent retrievers). This method was first used in 2008 and, in contrast with lysis therapy, shows superior recanalization rates of occluded brain base arteries in clinically severely affected patients who have large, proximal vascular occlusions.

The results of five independent randomized international studies published in 2015 showed a significant superiority of endovascular stroke treatment (mechanical thrombectomy, MT) in occlusions of large brain base arteries. Based on these results, the relevant national and international specialist societies, such as the German Stroke Society (DSG), the German Society for Neurology (DGN) and the German Society for Neuroradiology (DGNR) have supplemented their guidelines and recommend interventional thrombectomy for treating acute strokes.

In order to technically carry out the thrombectomy, a catheter is inserted into the arterial vascular system usually via the femoral artery of a patient using sedation or intubation. The feeding of the catheter is monitored by sequential fluoroscopy (X-ray method). A large-lumen guide catheter is inserted into the arteria carotis interna to just below the base of the skull. Contrast medium (KM) can be applied via this guide catheter and small-lumen catheters, i.e. intermediate or distal access catheters (DAC) and microcatheters, can be inserted intracranially as far as to the thrombus. The use of DAC has proven to be advantageous because it increases the recanalization rate and reduces the risk of thrombus material being carried over to other territories.

A microcatheter is guided past the thrombus by means of the DAC. The microcatheter is retracted to release a stent retriever. The meshes of the deployed stent retriever interact with the thrombus. If the stent is now retracted into the DAC using aspiration, i.e. suction due to negative pressure, there is a risk of losing the entire thrombus or parts of the thrombus because these are removed at the distal end of the DAC. Specifically, the stent retriever is guided past the intra-arterial thrombus by means of a microcatheter and the stent is released after the microcatheter has been withdrawn. After the microcatheter has been completely withdrawn, the deployed stent is pulled together with the thrombus back into the cylindrical DAC which was previously used as standard. When the distal diameter of the DAC is small, the thrombus projecting beyond the meshes of the stent is removed at the wall of the DAC during retraction and individual pieces of removed thrombus material are transported into the periphery by the blood stream.

Mechanical thrombectomy is limited by the fact that thrombus material trapped in the stent can be removed during retraction into the DAC. The reason for this is that the distal cylindrical diameter of the DAC is too small in relation to the stent.

DE 10 2006 039 823 A1 and DE 10 2007 048 794 A1 disclose a catheter stent device for applying and implanting a stent for treating vessels of the body or hollow organs of the body. The catheter guiding the stent is tubular and has a cylindrical cross section.

U.S. Pat. No. 6,217,585 B1 describes a deployment device which consists of an expansion framework or expansion cage near the distal end of the catheter. The cage consists of elongate strands coupled to the catheter at opposite ends and to a control means at the proximal end of the strands. Axial movement of the control device relative to the catheter either stretches the strands such that they radially compress the cage, or reduces the distance between the ends of the strands to achieve radial expansion.

DE 60 2004 010 344 T2 discloses a system for treating a vascular condition or vascular disease. The system comprises a catheter which has an elongate inner member and at least one flexible, longitudinally oriented outer member which is functionally attached to a distal portion of the elongate inner member; the distal portion of the elongate inner member having a cap portion. The system further comprises a stent having a proximal end and a distal end, the stent being arranged on a distal portion of the flexible outer member of the catheter. The catheter is designed such that, when the elongate inner member is pulled back, the cap portion moves in a proximal direction and causes the distal portion of the outer member to move over the cap portion, and the flexible outer member folds longitudinally adjacent to an inner side of the stent in order to cause the stent to deploy.

SUMMARY

A catheter for insertion into a vessel (6) is designed at its free end (2) such that, in a first state, it is cylindrical and, in a second state, it has a conical shape, the largest diameter being associated with the peripheral end (2). The aim of the invention is that of providing a catheter of the type mentioned at the outset which avoids thrombus material trapped in a stent from being removed when a stent is retracted.

DETAILED DESCRIPTION

The object of the invention is that of providing a catheter of the type mentioned at the outset which avoids thrombus material trapped in a stent from being removed when the stent is retracted.

According to the invention, the object is achieved by the features of the independent claim.

The dependent claims constitute advantageous embodiments of the invention.

The catheter used in the context of the invention is an intermediate or distal access catheter (DAC).

The catheter for insertion into a vessel is designed at its free end such that, in a first state, it is cylindrical and, in a second state, it has a conical shape, the largest diameter being associated with the peripheral end.

For the mechanical thrombectomy during stroke treatment, the tubular, i.e. cylindrical, catheter is inserted intracranially, i.e. in one direction within the skull of a patient, as far as a thrombus. Since a catheter which is conically widened in the distal portion, i.e. at the peripheral free end, is problematic when inserted into narrow-caliber blood vessels, for example intracranially in the present case, the free end of the catheter is initially in a first state in which it is tubularly cylindrical and can be pushed through the corresponding vessels relatively easily. In the second state, the free end of the catheter is conically widened such that the large diameter of the cone is associated with the peripheral free end and does not interfere with a withdrawal of the catheter.

In one embodiment, the catheter is inserted so as to be preloaded in a sleeve arranged at the end side, the sleeve being movably arranged on the catheter in order to release the deforming end region. The sleeve, which extends over the conically self-deploying end-side portion of the catheter, can be moved, for example, by means of a microcatheter, which is also used to move a stent, or by means of a negative pressure in the catheter, optionally supported by a forward movement, with the sleeve remaining on the catheter in the tubular cylindrical region thereof.

At its deformable free end, the catheter preferably consists of a cryogenic material or comprises a component which consists of a cryogenic material. The cryogenic material, which is expediently formed as a nickel-titanium alloy, is, for example, a type of shape memory alloy which is also referred to as a memory metal. Of course, in addition to or as an alternative to the memory effect, an elastic restoring force of the cryogenic material can also be used to deform the catheter in the end region thereof.

The component deforming the catheter is expediently designed to be spiral or helical. Furthermore, the component is designed as a wire having a cylindrical cross section.

The component is inserted into the interior of the catheter so that the component does not interfere with using the catheter. Alternatively or additionally, a sheath material of the catheter envelops the component. For example, the catheter can be designed so as to be double-walled in the end-side region, which can be expanded conically and receives the component, in order to envelop the component.

The large diameter of the conical end of the catheter at its free end is preferably adapted to the internal diameter of a vessel to be treated. The large diameter of the deployed catheter then completely fills the vessel lumen or its internal diameter and thus prevents the thrombus material from being removed at the opening of the catheter when a stent is drawn in and, at the same time, prevents blood from flowing in the distal direction during the thrombectomy maneuver, as a result of which the thrombectomy is supported.

It goes without saying that the features which are mentioned above and are still to be explained below can be used not only in the combination specified in each case but also in other combinations. The scope of the invention is defined only by the claims.

BRIEF DESCRIPTION OF THE DRAWINGS

The invention is explained in more detail below on the basis of an exemplary embodiment with reference to the associated drawings, in which:

FIG. 1 is a schematic view of a catheter according to the invention with a free end in a first state within a vessel and FIG. 2 is a schematic view of the catheter according to FIG. 1 with a free end in a second state within a vessel with an associated stent.

DETAILED DESCRIPTION OF THE PREFERRED EMBODIMENTS

The catheter 1 can consist of a flexible, biocompatible, polymeric material, such as polyurethane, polyethylene, nylon or PTFE, or comprise such a material. The catheter 1 is substantially tubular and has a cylindrical cross section. Expediently, the catheter 1 is a distal access catheter (DAC) which is designed at its free end 2, the distal end, such that, in a first state, the catheter is tubularly cylindrical, such that it does not adversely affect the insertion into narrow-caliber vessels 6 (hereinafter intracranial), and, in a second state, the catheter has a conical shape, the largest diameter being associated with the peripheral end 2, such that, for example, a thrombus is not removed at the free end 2 of the catheter 1 during a retraction maneuver of a stent 3.

In order to reliably keep the free end 2 of the catheter 1, particularly during intracranial insertion, in the first state in which it is tubular and has a cylindrical cross section, the catheter 1 is positioned so as to be preloaded in a sleeve 4 arranged on the end side. The sleeve 4 is movably arranged on the catheter 1. The sleeve 4 can be withdrawn from the free end 2 of the catheter 1, for example, by means of a microcatheter which can be coupled to the sleeve 4 or by means of a slight negative pressure in the catheter 1 if corresponding flow channels are formed between the catheter 1 and the sleeve 4.

After the sleeve 4 is withdrawn from the deformable free end of the catheter 1, said catheter assumes the conical shape either because of the elastic properties of the material from which it is made or because of a component 5 which is arranged on the end side and has elastic properties. The catheter 1 can have, for example, a cryogenic material formed as a nickel-titanium alloy on the end side or the component 5 is made from a cryogenic material of this type.

The component 5 formed, for example, from a wire 8 that is cylindrical in cross section can be arranged inside the catheter 1 and the elastic catheter 1 can also be double-walled in order to receive the component 5 which is wound in the manner of a spring.

After pulling back the sleeve 4, the catheter 1 assumes the second state in which it is conical. This ensures that, even with different vessel diameters, the distal catheter 1 completely fills the vessel lumen and the thrombus is not removed by the stent 3 during the retraction maneuver. At the same time, the conically widened end 2 of the catheter 1 prevents the blood from flowing in the distal direction during the thrombectomy maneuver and thus supports the thrombectomy.

LIST OF REFERENCE NUMERALS

1. Catheter
2. End
3. Stent
4. Sleeve

5. Component
6. Vessel
7. Wire

The invention claimed is:

1. A catheter for insertion into a vessel, characterized in that the catheter is a distal access catheter (DAC) comprising:
- a variable stiffness design with a stiffer proximal section for improved pushability and a softer distal section for atraumatic navigation in narrow intracranial vessels,
- an outer diameter in the range of 1 to 2 mm and an inner lumen configured for passage of microcatheters or stent retrievers,
- a distal portion made up of a flexible polymer or a combination of the flexible polymer and a nitinol element and having a hydrophilic coating, and
- a free end which in a first state is cylindrical and in a second state has a conical shape with a maximum distal diameter in the range of 3 to 6 mm, which is adapted to the diameter of intracranial vessels,
- wherein movement of a slider/sheath releases a flexible end portion of the catheter, wherein a sheath material of the catheter encases a component, and
- wherein movement of the slider/sheath is via aspiration.

2. The catheter according to claim 1, characterized in that the catheter (1) is inserted so as to be preloaded in a sleeve (4) arranged at an end side, the sleeve (4) being movably arranged on the catheter (1) in order to release a deformable end region.

3. The catheter according to claim 1, characterized in that the catheter (1), at a deformable free end, consists of a cryogenic material or comprises the component (5) which consists of a cryogenic material.

4. The catheter according to claim 3, characterized in that the cryogenic material is formed as a nickel-titanium alloy.

5. The catheter according to claim 3, characterized in that the component (5) is spiral or helical.

6. The catheter according to claim 3, characterized in that the component (5) is designed as a wire (7) having a cylindrical cross section.

7. The catheter according to claim 3, characterized in that the component (5) is inserted into an interior of the catheter (1).

8. The catheter according to claim 1, characterized in that a large diameter of a conical end (2) of the catheter (1) at its free end (2) is adapted to an internal diameter of a vessel (6) to be treated.

* * * * *